(12) United States Patent
Allain et al.

(10) Patent No.: US 10,212,143 B2
(45) Date of Patent: Feb. 19, 2019

(54) AUTHORIZING AN UNTRUSTED CLIENT DEVICE FOR ACCESS ON A CONTENT MANAGEMENT SYSTEM

(71) Applicant: Dropbox, Inc., San Francisco, CA (US)

(72) Inventors: Francois Alexander Allain, San Francisco, CA (US); Jie Tang, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 281 days.

(21) Appl. No.: 14/169,245

(22) Filed: Jan. 31, 2014

(65) Prior Publication Data

US 2015/0222615 A1 Aug. 6, 2015

(51) Int. Cl.
*G06F 7/04* (2006.01)
*H04L 29/06* (2006.01)
*H04L 29/08* (2006.01)

(52) U.S. Cl.
CPC .............. *H04L 63/08* (2013.01); *H04L 63/10* (2013.01); *H04L 67/26* (2013.01); *H04L 63/068* (2013.01); *H04L 63/108* (2013.01); *H04L 67/1095* (2013.01)

(58) Field of Classification Search
CPC ..... H04L 63/10; H04L 65/403; H04L 65/105; H04N 21/2541; G06F 21/31; G06F 21/335; G06F 21/62
See application file for complete search history.

(56) References Cited

U.S. PATENT DOCUMENTS

| 7,251,670 | B1 * | 7/2007 | Day | G06F 17/30212 |
| | | | | 707/638 |
| 8,042,163 | B1 * | 10/2011 | Karr | G06F 3/062 |
| | | | | 713/164 |
| 8,266,428 | B2 * | 9/2012 | Kwon | H04L 29/12358 |
| | | | | 713/153 |
| 8,499,330 | B1 * | 7/2013 | Albisu | H04L 63/10 |
| | | | | 726/1 |
| 9,264,480 | B1 * | 2/2016 | Saylor | H04L 67/06 |
| 9,323,916 | B1 * | 4/2016 | Wu | G06F 21/44 |
| 2002/0019941 | A1 * | 2/2002 | Chan | G06F 21/53 |
| | | | | 713/185 |
| 2004/0117310 | A1 * | 6/2004 | Mendez | G06F 21/62 |
| | | | | 705/50 |
| 2005/0055386 | A1 * | 3/2005 | Tosey | G06F 17/30575 |
| 2006/0015580 | A1 * | 1/2006 | Gabriel | H04N 7/17309 |
| | | | | 709/219 |
| 2006/0080316 | A1 * | 4/2006 | Gilmore | G06F 17/30864 |

(Continued)

*Primary Examiner* — Farid Homayounmehr
*Assistant Examiner* — Lizbeth Torres-Diaz
(74) *Attorney, Agent, or Firm* — Polsinelli PC

(57) ABSTRACT

A method, system, and manufacture for authorizing an untrusted client device for access on a content management system. The content management system receives a request from an untrusted client device to access content on the content management system. The content management system sends an authentication key to the untrusted client device. The content management system then receives the authentication key from a trusted client device. Based on the matching authentication key, the content management system transmits data to the untrusted client device in accordance with any additional instructions that the trusted client device may have sent.

18 Claims, 11 Drawing Sheets

(56) References Cited

U.S. PATENT DOCUMENTS

| | | | | |
|---|---|---|---|---|
| 2009/0260064 A1* | 10/2009 | McDowell | G06F 21/10 | 726/4 |
| 2010/0037298 A1* | 2/2010 | Lottin | H04L 29/12594 | 726/4 |
| 2010/0057785 A1* | 3/2010 | Khosravy | G06F 17/30578 | 707/E17.005 |
| 2012/0079095 A1* | 3/2012 | Evans | G06F 8/61 | 709/224 |
| 2013/0121489 A1* | 5/2013 | Pestoni | H04L 9/0822 | 380/210 |
| 2013/0124595 A1* | 5/2013 | Oplinger | H04W 4/21 | 709/201 |
| 2013/0124649 A1* | 5/2013 | Triantos | G06Q 10/103 | 709/206 |
| 2013/0318589 A1* | 11/2013 | Ford | H04L 63/08 | 726/7 |
| 2013/0347044 A1* | 12/2013 | Lee | H04N 21/2387 | 725/88 |
| 2014/0101434 A1* | 4/2014 | Senthurpandi | G06F 12/1408 | 713/150 |
| 2014/0157435 A1* | 6/2014 | Stamos | H04L 63/04 | 726/28 |
| 2014/0215210 A1* | 7/2014 | Wang | G06F 21/6209 | 713/165 |
| 2015/0178516 A1* | 6/2015 | Mityagin | G06F 21/6218 | 707/783 |
| 2015/0242597 A1* | 8/2015 | Danciu | G06F 21/10 | 726/30 |

* cited by examiner

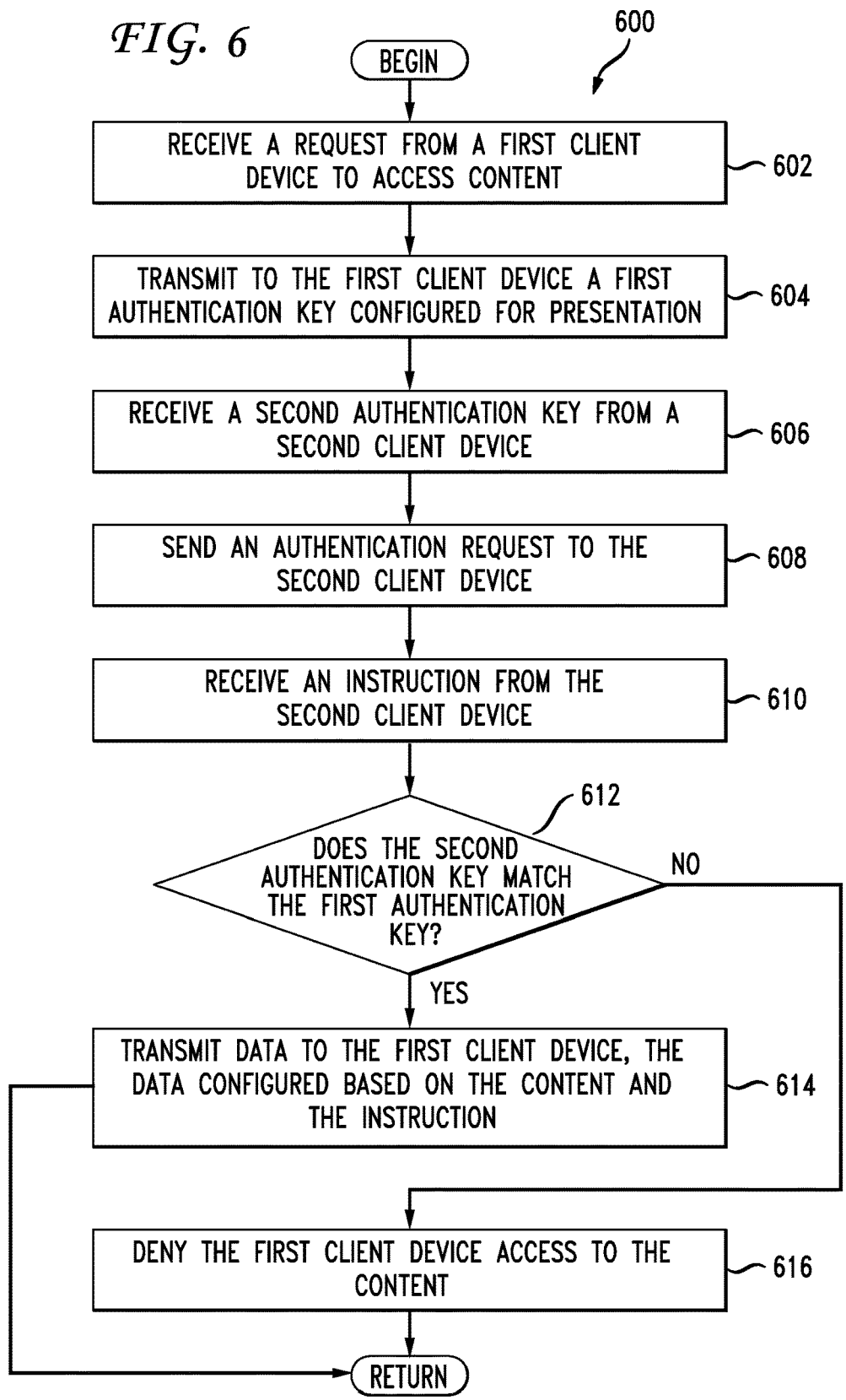

AUTHORIZING AN UNTRUSTED CLIENT DEVICE FOR ACCESS ON A CONTENT MANAGEMENT SYSTEM

TECHNICAL FIELD

The present technology pertains to content management systems, and more specifically pertains to providing access to data stored on a content management system to untrusted client devices.

BACKGROUND

Synchronized online content management systems allow users to easily store data online and share the data without having to worry about transporting storage media such as CD-ROMs, flash drives, or memory cards between two different computing devices. One of the promises of cloud computing is that once you store your data in the "cloud," you can access the data with any device you want from anywhere you want. People frequently use these cloud-based online content management systems to access data from their personal computers, mobile phones, and tablet devices. However, being able to access all of your data from every device you may come across may not be ideal in certain situations. Some computing devices might be inherently insecure in their design. Other devices are shared by strangers who cannot always be trusted. Still other devices might have been already compromised by malware or a computer virus. Thus, a user might not want to expose all of her data, which may include personal, sensitive, or confidential information, to those devices that she cannot completely trust.

For example, a library customer who uses a publicly shared computer terminal, a lecturer who needs to deliver a presentation on an unfamiliar laptop computer at an academic conference, and a subway commuter who forgot to bring his own smart phone and now has to borrow a stranger's phone to access an important business document, all have one thing in common: they may all feel uncomfortable about potentially exposing sensitive information to an unfamiliar and untrustworthy computing environment. In each of these situations, the user cannot be entirely sure that the device that he or she is using for the first time is securely designed, is not shared by exploitative users, and has not fallen prey to malicious software.

The current solution for situations like these is simply to be wary of these pitfalls and not access sensitive or confidential data when the device cannot be reasonably trusted. This is because most content management systems do not allow access management on a per-device basis. In other words, it is often impractical or impossible to control access with a fine-grain precision when it comes to assigning different access privileges to different devices. Therefore, the need for a more versatile, robust, and convenient method of authorizing untrusted computing devices is paramount.

In addition, for non-traditional computing devices, such as smart televisions and smart appliances, which offer only a very limited user interface, it can often be very cumbersome and unwieldy to pair those devices to a content management system. For example, armed only with a remote control and lacking a full-size keyboard, televisions are notoriously challenging to interact with, especially when the users need to input complex information such as a username and password. Sharing data with such limited-purpose devices can be difficult.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for authorizing an untrusted device or an unauthorized user account for data access on a content management system. Users are often faced with the need to access content from an untrusted or unauthorized computing device. For example, a consultant could be visiting a client corporation to give a presentation. The consultant needs to access and download the presentation from an online content management from an unfamiliar computer offered by the client. Because the consultant does not trust the device, the consultant may not wish to give the device full access to all of her data stored in the content management system. In a different scenario, a user may want to access content from a non-traditional computing device, such as a television. The user is only interested in temporarily displaying limited content using the television, and may not want to authorize the television to access the user's full account.

One solution that would permit the user to access the necessary content but limit the exposure of the user's entire user account could be to authenticate the untrusted device for the desired content. Moreover, the user can set up a set of restrictions on the time duration and the method of access. One way to accomplish this is for the user to request that a code, such as an authentication key, be sent to the untrusted device in the form of a text string, a QR code, a picture, or a sound, detectable by a second client device that is trusted by the user and/or the content management system. The user can then use the second device to perceive the code and send the results to the content management system. The content management system would then recognize that the authorization comes from a legitimate user with proper authority to make such an authorization. In addition to sending the code to the content management system, the user can also append additional instructions pertaining to what data to share, how to share, when to share, etc.

The content management system can then push appropriate data to the untrusted device. The data sharing can be regulated by the fine-grain detail of the instructions specified by the user. The pushed data can vary with the configuration. For example, the pushed data can be a token, a link from which the content can be displayed or downloaded, or the content itself. This permits the user to always have the precision control over the shared data. For example, the user can dictate which content item can be shared on which client device, when the access privilege may expire, which delivery method will be used, what version of the content item is to be shared, etc. The user can also transmit additional commands or instructions to the content management system at a later time to terminate the sharing session or modify the terms of data sharing.

Alternatively, the authorization may take place on a per-user-account basis instead of a per-device basis. In other words, authorization to access content can be given to a specific user account instead of a specific device. In such scenarios, when a user with an unauthorized user account desires to access certain content on the content management system, he can obtain a code from the content management system and ask another user, who is authorized to grant access privilege to other users, to authorize the requested data access. The authorized user can then use the code given by the requesting user (i.e., unauthorized user) to request to the content management system to transmit the content to the requesting user. After authenticating both the code and the authorized user's user account, the content management system may allow the requesting user to have access to the requested content.

BRIEF DESCRIPTION OF THE DRAWINGS

The above-recited and other advantages and features of the disclosure will become apparent by reference to specific embodiments thereof which are shown in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 shows a first example method embodiment.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for authorizing an untrusted device or an unauthorized user account to have access privilege to content on a server. An authentication key is issued to the untrusted device or the unauthorized user account. The authentication key is sent back to the server from a trusted device or a trusted user account. The server compares the received authentication key with the one that it has issued earlier and verifies the authorization. The server sends a link, a token, or a content item to the untrusted device or the unauthorized user account for access.

Figure 1:
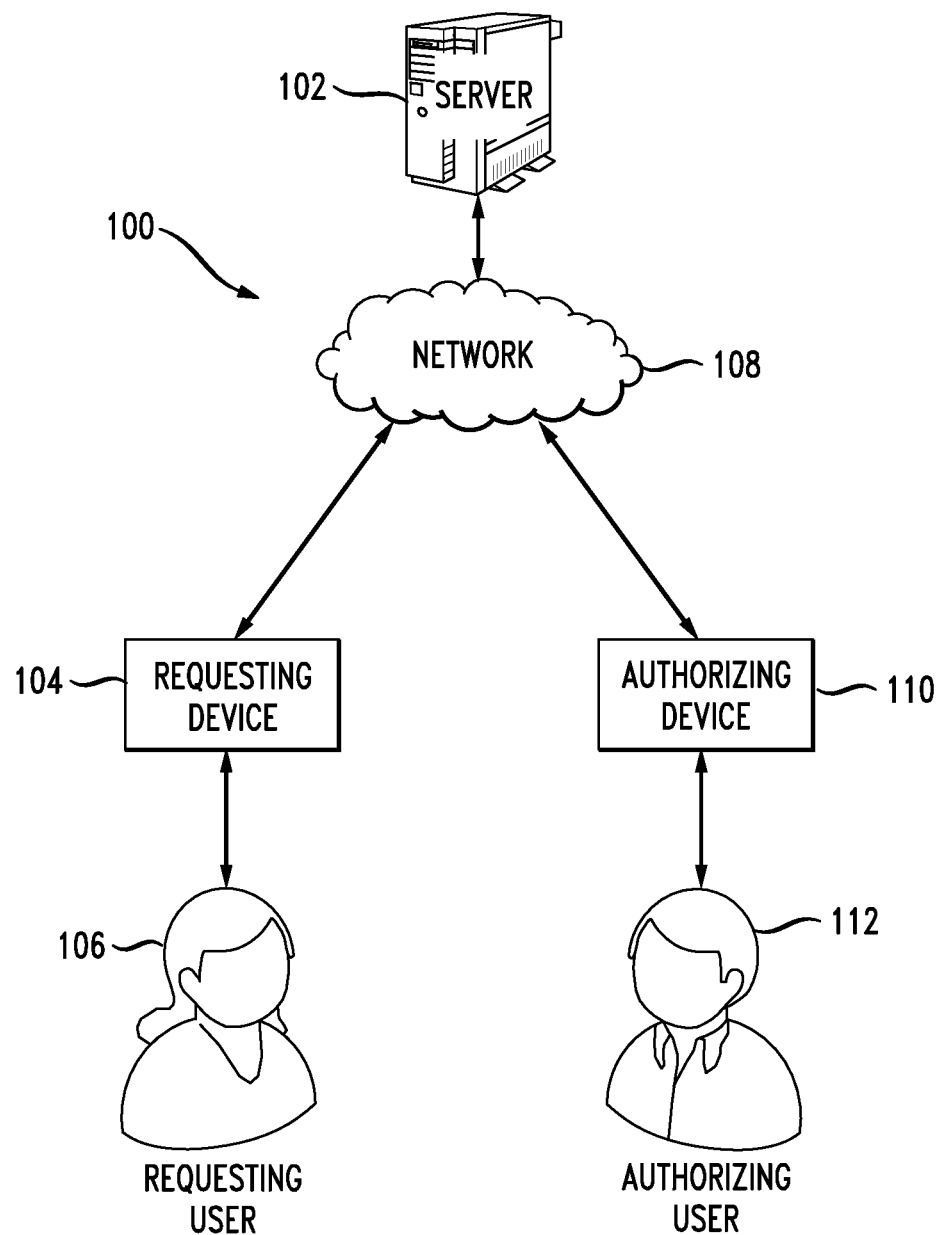
FIG. 1 shows an exemplary configuration of a server, devices and a network in accordance with the invention.

With respect to implementing various embodiments of the disclosed technology, an exemplary system configuration 100 is shown in FIG. 1, wherein electronic devices such as server 102, requesting device 104, and authorizing device 110, communicate via network 108 for purposes of exchanging content and other data. The system can be configured for use on a wide area network such as that shown in FIG. 1. However, the present principles are applicable to a wide variety of network configurations that facilitate the intercommunication of electronic devices. For example, each of the components of system 100 in FIG. 1 can be implemented in a localized or distributed fashion in a network. Network 108 can be a public network, such as the Internet, but can also include a private or quasi-private network, such as an intranet, a home network, a virtual private network (VPN), a shared collaboration network between separate entities, etc. Indeed, the principles set forth herein can be applied to many types of networks, such as local area networks (LANs), virtual LANs (VLANs), corporate networks, wide area networks, ad hoc networks, and virtually any other form of suitable wired or wireless network. Many different forms of communication may be employed on such network 108, including Wi-Fi, Ethernet, Bluetooth, near field communication (NFC), and infrared data association (IrDA).

Server 102 may serve data and content to one or more client devices. Server 102 can be a synchronized online content management system, such as Dropbox™ from Dropbox Inc. of San Francisco, Calif. Server 102 may contain various types of data including digital data, documents, text files, audio files, video files, etc. Server 102 may maintain and manage user accounts through which various users can access private and public content. Server 102 may allow the users to share certain information and data with other users. Such sharing can be facilitated on the basis of a list of authorized users. For example, user Alice may authorize user Bob to have access to her family photos. Alternatively, information can be shared based on a list of trusted devices. For example, Alice may have her smart phone and her laptop computer registered as trusted devices with server 102. She can access the content on server 102 through either one of her trusted devices, but if she wants to access the content on server 102 through an untrusted device such as her tablet device, she would have to first have the tablet device registered or authorized either permanently or temporarily.

Requesting device 104 can be a client device through which requesting user 106 is trying to access content on server 102. Requesting device 104 can be an untrusted device. This may mean that the device is either not on server's 102 list of trusted devices or it is on server's 102 list of untrusted devices, with regards to the requested content. For example, Alice's tablet device has never been registered with or authorized by server 102 in the past and hence is not on the list of trusted devices associated with a financial document that Alice wants to retrieve from server 102. In this case, Alice cannot access the file without first authorizing or registering her tablet device with server 102. As will be shown in greater detail below, one way of authorizing an untrusted device is to do it with a help of a trusted device. Such a trusted device can function as authorizing device 110 that aids in the process of authorizing requesting device 104. In such a scenario, requesting user 106 and authorizing user 112 can be different persons or the same person.

Alternatively, requesting user 106 using requesting device 104 may have a user account that is not yet authorized to access content on server 102. In this scenario, requesting user 106 may gain access to the content on server 102 through authorizing user 112 who holds a trusted user account. With a help of authorizing user 112, requesting user 106 may be given access privilege to the content, to which authorizing user 112 has granted access. Requesting device 104 and authorizing device 110 may be one and the same, or they can be two separate client devices. As an illustration, server 102 may contain several shared folders. One such shared folder contains audio recordings from the latest sales meetings. User Aaron has been given access to the shared folder and he has a trusted user account with an invite privilege to authorize other users' access to the folder. Rebecca is not yet authorized to access the shared folder and would like to listen to some of the recordings of the meetings. When Rebecca requests access to the shared folder, Aaron can authorize Rebecca's access to the shared folder.

Although FIG. 1 shows server 102 operating with one requesting device 104, one authorizing device 110, one requesting user 106, and one authorizing user 112, server 102 can also share information with multiple requesting devices, multiple authorizing devices, multiple requesting users, and multiple authorizing users. Each requesting device or authorizing device can be also associated with multiple users and multiple user accounts. Server 102 may also consist of multiple servers, storage centers, and/or compute farms. Any shared information can be synchronized across multiple devices of one or more users. Moreover, system 100 may operate across multiple hardware and software platforms running on multiple servers and client devices. For example, requesting device 104 can run on the Android® mobile platform while authorizing device 110 runs on a Windows® desktop environment.

Figure 2:
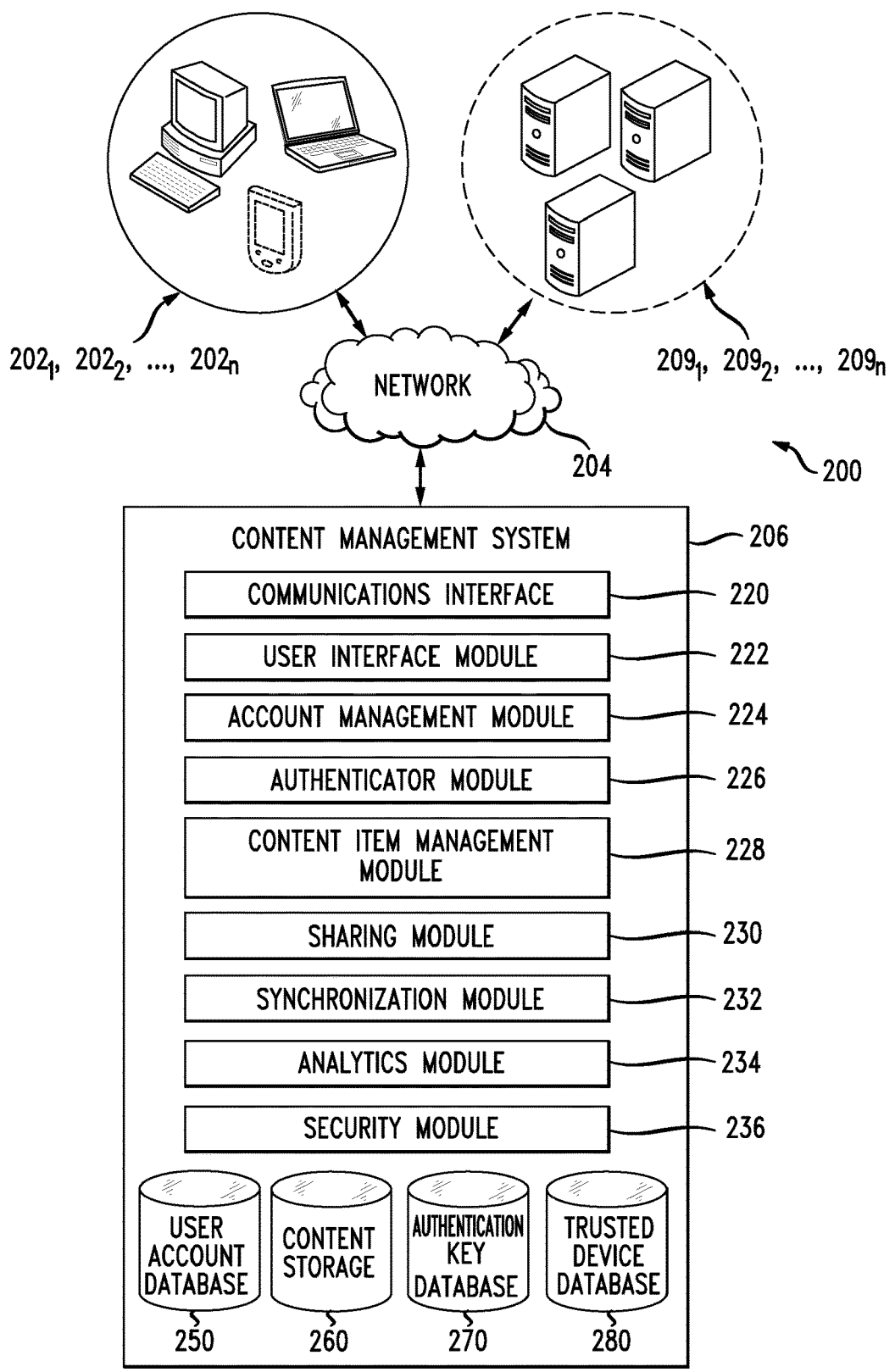
FIG. 2 shows an exemplary content management system configured to communicate with other devices through network in accordance with the invention.

With respect to implementing various embodiments of the disclosed technology, another exemplary system configuration 200 is shown in FIG. 2, wherein an exemplary content management system is configured to exchange content and other data with other devices through a network. Content management system 206 can be an embodiment of server 102 that serves content and other data. The system can be configured for use on a wide area network such as that shown in FIG. 2. However, the present principles are applicable to a wide variety of network configurations that facilitate the intercommunication of electronic devices. For example, each of the components of system 200 in FIG. 2 can be implemented in a localized or distributed fashion in a network.

In system 200, a user can interact with content management system 206 through client devices $202_1$, $202_2$, . . . , $202_n$ (collectively "202") connected to network 204 by direct and/or indirect communication. Content management system 206 can support connections from a variety of different client devices, such as desktop computers; mobile computers; mobile communications devices, e.g. mobile phones, smart phones, tablets; smart televisions; set-top boxes; and/or any other network-enabled computing devices. Client devices 202 can be of varying types, capabilities, platforms, operating systems, etc. Furthermore, content management system 206 can concurrently accept connections from and interact with multiple client devices 202. One or more of client devices 202 can be requesting device 104 that requests to access content on content management system 206. Similarly, one or more of client devices 202 can be authorizing device 110, which is given the privilege to invite other untrusted devices to access content on content management system 206.

A user can interact with content management system 206 via a client-side application installed on client device $202_i$. The client-side application can include a content management system specific component. For example, the component can be a stand-alone application, one or more application plug-ins, and/or a browser extension. The component can be also integrated into an operating system and/or a system application that runs on client device $202_i$. However, the user can also interact with content management system 206 via a third-party application, such as a web browser, that resides on client device $202_i$ and is configured to communicate with content management system 206. In either case, the client-side application can present a user interface (UI) for the user to interact with content management system 206. For example, the user can interact with content management system 206 via a client-side application integrated with the file system or via a webpage displayed using a web browser application.

Content management system 206 can make it possible for a user to store content, as well as perform a variety of content management tasks, such as retrieve, modify, browse, and/or share the content. Furthermore, content management system 206 can make it possible for a user to access the content from multiple client devices 202. For example, client device $202_i$ can upload content to content management system 206 via network 204. The content can later be retrieved from content management system 206 using the same client device $202_i$ or some other client device 202.

To facilitate the various content management services, a user can create an account with content management system 206. The account information can be maintained in user account database 250. User account database 250 can store profile information for registered users. In some cases, the only personal information in the user profile can be a username and/or email address. However, content management system 206 can also be configured to accept additional user information.

User account database 250 can also include account management information, such as account type, e.g. free or paid; usage information, e.g. file edit history; maximum storage space authorized; storage space used; content storage locations; security settings; personal configuration settings; content sharing data; etc. Account management module 224 can be configured to update and/or obtain user account details in user account database 250. The account management module 224 can be configured to interact with any number of other modules in content management system 206.

An account can be used to store content, such as digital data, documents, text files, audio files, video files, etc., from one or more client devices 202 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 260. Content storage 260 can be a storage device, multiple storage devices, or a server. Alternatively, content storage 260 can be a cloud storage provider or network storage accessible via one or more communications networks. Content management system 206 can hide the complexity and details from client devices 202 so that client devices 202 do not need to know exactly where the content items are being stored by content management system 206. In one variation, content management system 206 can store the content items in the same folder hierarchy as they appear on client device $202_i$. However, content management system 206 can store the content items in its own order, arrangement, or hierarchy. Content management system 206 can store the content items in a network accessible storage (SAN) device, in a redundant array of inexpensive disks (RAID), etc. Content storage 260 can store content items using one or more partition types, such as FAT, FAT32, NTFS, EXT2, EXT3, EXT4, ReiserFS, BTRFS, and so forth.

Content storage 260 can also store metadata describing content items, content item types, and the relationship of content items to various accounts, folders, or groups. The metadata for a content item can be stored as part of the content item or can be stored separately. In one variation, each content item stored in content storage 260 can be assigned a system-wide unique identifier.

Content storage 260 can decrease the amount of storage space required by identifying duplicate files or duplicate segments of files. Instead of storing multiple copies, content storage 260 can store a single copy and then use a pointer or other mechanism to link the duplicates to the single copy. Similarly, content storage 260 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 206 can be configured to support automatic synchronization of content from one or more client devices 202. The synchronization can be platform agnostic. That is, the content can be synchronized across multiple client devices 202 of varying types, capabilities, operating systems, etc. For example, client device $202_i$ can include client software, which synchronizes, via a synchronization module 232 at content management system 206, content in client device $202_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 206. Conversely, the background process can identify content that has been updated at content management system 206 and synchronize those changes to the local folder. The client software can provide notifications of synchronization operations, and can provide indications of content statuses directly within the content management application. Sometimes client device $202_i$ may not have a network connection available. In this scenario, the client software can monitor the linked folder for file changes and queue those changes for later synchronization to content management system 206 when a network connection is available. Similarly, a user can manually stop or pause synchronization with content management system 206.

A user can also view or manipulate content via a web interface generated and served by user interface module 222. For example, the user can navigate in a web browser to a web address provided by content management system 206. Changes or updates to content in the content storage 260 made through the web interface, such as uploading a new version of a file, can be propagated back to other client devices 202 associated with the user's account. For example, multiple client devices 202, each with their own client software, can be associated with a single account and files in the account can be synchronized between each of the multiple client devices 202.

Content management system 206 can include communications interface 220 for interfacing with various client devices 202, and can interact with other content and/or service providers $209_1$, $209_2$, ..., $209_n$ (collectively "209") via an Application Programming Interface (API). Certain software applications can access content storage 260 via an API on behalf of a user. For example, a software package, such as an app on a smartphone or tablet computing device, can programmatically make calls directly to content management system 206, when a user provides credentials, to read, write, create, delete, share, or otherwise manipulate content. Similarly, the API can allow users to access all or part of content storage 260 through a web site.

Particularly with respect to implementing various embodiments of the disclosed technology, communications interface 220 may receive a request from requesting device 104 to access particular content on content management system 200. Such request can be a signal, a packet, a message, a command, or a code that specifies a content item whose access is being requested. Such request may also include information that uniquely identifies requesting device 104. Alternatively, the request may include information that uniquely identifies a user account belonging to requesting user 106. Communication interface 220 may further transmit and receive authentication keys to and from client devices 202. Finally, communications interface 220 can facilitate client device $202_i$ to access content on content management system 206 by sending a token, a link, a content item, repackaged data, etc.

Content management system 206 can also include authenticator module 226, which can verify user credentials, security tokens, API calls, specific client devices, and so forth, to ensure only authorized clients and users can access files. Authenticator module 226 may contain an authentication key generator (not shown in FIG. 2), which, in response to an access request from requesting device 104, generates a unique key for the purpose of authenticating an untrusted device or an unauthorized user account. Once generated, such authentication key can be linked to the request, the appropriate content item, and/or requesting device 104. The generated keys can be stored in authentication key database 270 to be retrieved later for authentication. Once content management system 206 receives an authentication key from a client device, authenticator module 226 may determine whether the received authentication key matches the one that is stored in authentication key database 270.

An untrusted device can be added to the list of trusted devices stored inside trusted device database 280. Trusted device database 280 may contain unique identifiers of trusted devices along with any information on which content each trusted device is authorized to access and any access restrictions imposed on the devices such as an expiration time, a number of access, a version, etc. Alternatively, trusted device database 280 may store a list of untrusted devices with an assumption that the devices not on the list are authorized to access the content.

Security module 236 can manage a privacy and/or security policy to prevent unauthorized access to user data stored with content management system 206. Each content item in content storage 260 may be assigned various access permissions based on client devices 202 and user accounts. For example, security module 236 may assign read/write access privilege for a video clip stored in content storage 260 only to client devices $202_1$ and $202_3$, but only read access privilege to other client devices. In another example, security module 236 may allow contents of a specific shared folder to be accessed by user Anthony but not user Barbara.

Further, content management system 206 can include analytics module 234 that can track and report on aggregate file operations, user actions, network usage, total storage space used, as well as other technology, usage, or business metrics.

Content management system 206 can include sharing module 230 for managing sharing content publicly or privately. Sharing content publicly can include making the content item accessible from any computing device in network communication with content management system 206. Sharing content privately can include linking a content item in content storage 260 with two or more user accounts so that each user account has access to the content item. The sharing can be performed in a platform agnostic manner. That is, the content can be shared across multiple client devices 202 of varying type, capabilities, operating systems, etc. The content can also be shared across varying types of user accounts. The sharing can be facilitated by sending a link, a token, or data to client devices 202.

Content management system 206 can be configured to maintain a content directory identifying the location of each content item in content storage 260. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 206 can use the content path to present the content items in the appropriate folder hierarchy.

A content entry can also include a content pointer that identifies the location of the content item in content storage 260. For example, the content pointer can include the exact storage address of the content item in memory. The content pointer can point to multiple locations, each of which contains a portion of the content item.

In addition to a content path and content pointer, a content entry can also include a user account identifier that identifies the user account that has access to the content item. Multiple user account identifiers can be associated with a single content entry indicating that the content item has shared access by the multiple user accounts.

To share a content item privately, sharing module 230 can be configured to add a user account identifier to the content entry associated with the content item, thus granting the added user account access to the content item. Sharing module 230 can also be configured to remove user account identifiers from a content entry to restrict a user account's access to the content item.

To share content publicly, sharing module 230 can be configured to generate a custom network address, such as a uniform resource locator (URL), which allows any web browser to access the content in content management system 206 without any authentication. To accomplish this, sharing module 230 can be configured to include content identification data in the generated URL, which can later be used to properly identify and return the requested content item. For example, sharing module 230 can be configured to include the user account identifier and the content path in the generated URL. Upon selection of the URL, the content identification data included in the URL can be transmitted to content management system 206 which can use the received content identification data to identify the appropriate content entry and return the content item associated with the content entry.

In addition to generating the URL, sharing module 230 can also be configured to record that a URL to the content item has been created. The content entry associated with a content item can include a URL flag indicating whether a URL to the content item has been created. For example, the URL flag can be a Boolean value initially set to 0 or false to indicate that a URL to the content item has not been created. Sharing module 230 can be configured to change the value of the flag to 1 or true after generating a URL to the content item.

Sharing module 230 can also be configured to deactivate a generated URL. For example, each content entry can also include a URL active flag indicating whether the content should be returned in response to a request from the generated URL. For example, sharing module 230 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 230 can reactivate the URL by again changing the value of the URL active flag to 1 or true. A user can thus easily restore access to the content item without the need to generate a new URL.

While content management system 206 is presented with specific components, it should be understood by one skilled in the art, that the architectural configuration of system 206 is simply one possible configuration and that other configurations with more or less components are also possible. Each of the various modules shown in FIG. 2 as pertaining to content management system 206 is exemplary and may not be essential to the operations of content management system 206. Each module can be combined with any other module in form and/or function. For example, user interface module 224 and authenticator module 226 may share common and/or overlapping functionalities. In another example, authentication key database 270 may reside in the same physical database as content storage 260. In yet another example, the functions of communications interface 220 and authenticator module 226 may be closely intertwined to perform the operations of generating, transmitting, receiving, and verifying authentication keys. The physical configuration of the modules is not limited to what is shown in FIG. 2, and the modules can be arranged in many other ways, including spread across multiple devices, servers, networks, etc. in a distributed fashion.

Figure 3:
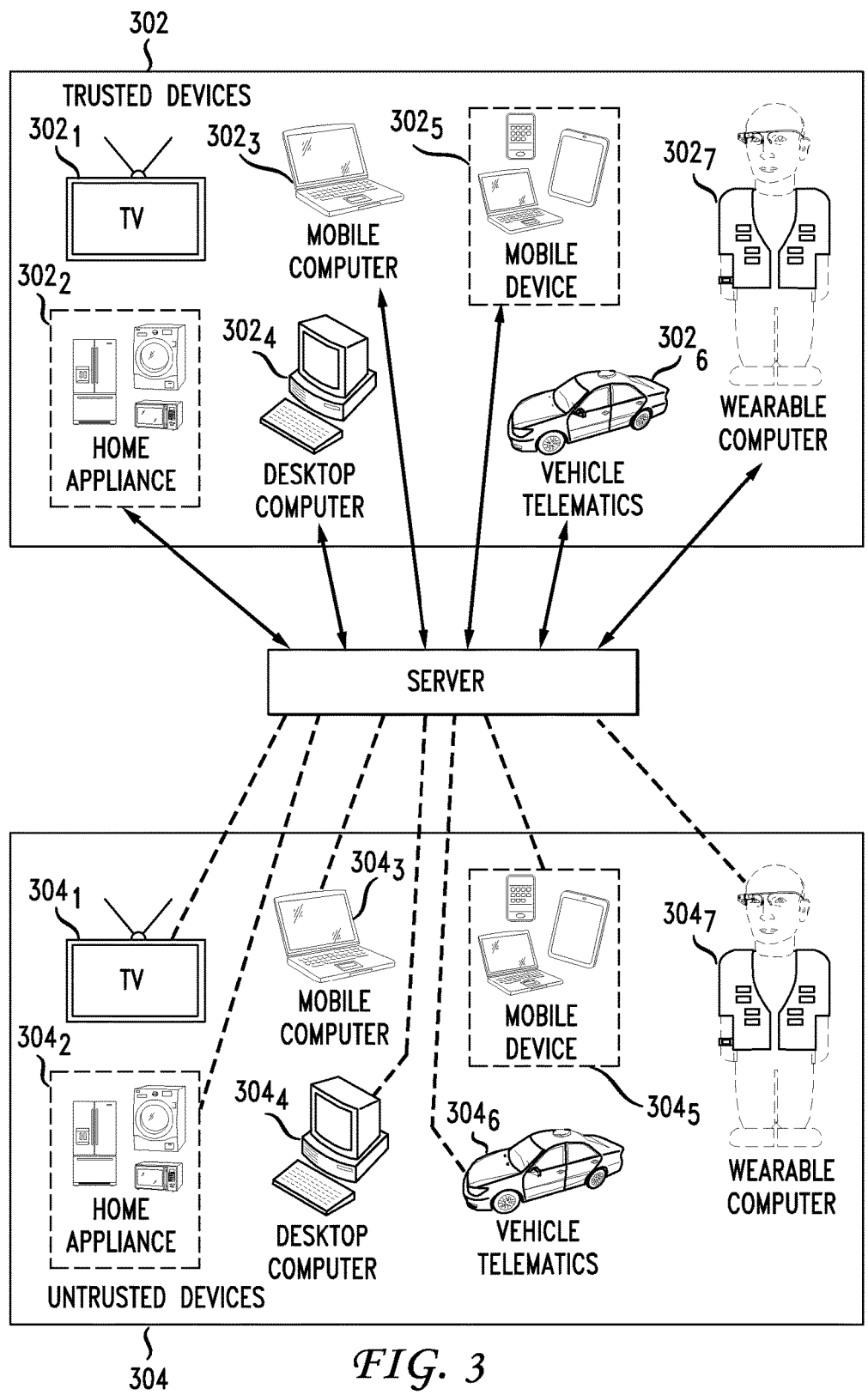
FIG. 3 shows exemplary trusted and untrusted client devices.

Having established the functionalities of various possible modules of content management system 206, which can be one embodiment of server 102, we now turn to FIG. 3, which shows exemplary trusted and untrusted client devices. Server 102 can be connected to various client devices, some of which can be trusted devices 302 and others can be untrusted devices 304. Trusted devices 302 can be those devices that are pre-registered with or pre-authorized by server 102 on a specific user account. Trusted devices 302 may be given the "invite" or "authorize" privilege, through various methods to be discussed below, to authorize untrusted devices 304 to access all or part of the user account's content on server 102. Trusted devices 302 may have varying degrees of access privilege for the user account's content, including read, write, modify, share, etc.

Trusted devices 302 can be television $302_1$; home appliance $302_2$; mobile computer $302_3$; desktop computer $302_4$; mobile device $302_5$, such as a cellular phone, a smart phone, a tablet, a digital audio player, a GPS device, etc.; vehicle telematics $302_6$; and/or wearable computer $302_7$, such as a head-mounted display, a smart watch, etc.

Server 102 may maintain and manage a list of trusted devices 302, for instance, in trusted device database 280. Each trusted device $302_i$ may be linked to a specific content item and/or a specific user account. For instance, user Alex's smart phone can be registered with server 102 as trusted mobile device $302_5$, authorized to access Alex's presentation handouts and Alex's and Brittany's shared folder containing their vacation photos.

Untrusted devices 304 are those devices that are not recognized by server 102 because they are not registered with or authorized to access content on server 102, with respect to a user account. Server 102 may maintain a list of untrusted devices 304, and a device is recognized as an untrusted one when server 102 determines that the device belongs in that list. Alternatively, server 102 determines that the device is not trusted when the device is not listed on the list of trusted devices 302. Similar to trusted devices 302, untrusted devices 304 can be television $304_1$; home appliance $304_2$; mobile computer $304_3$; desktop computer $304_4$; mobile device $304_5$, such as a cellular phone, a smart phone, a tablet, a digital audio player, a GPS device, etc.; vehicle telematics $304_6$; and/or wearable computer $304_7$, such as a head-mounted display, a smart watch, etc. One of the ways that an untrusted device $304_i$ can gain temporary or permanent access to content on server 102 is through a trusted device $302_j$, as will be shown through various embodiments of this technology. Similarly, once authorization for the access is revoked or terminated, untrusted devices 304 may lose the access.

Figure 4A:
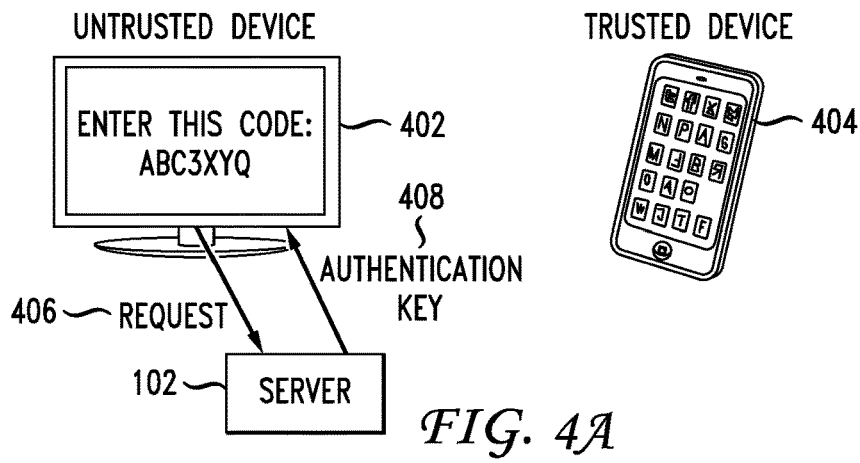
FIGS. 4A-4C show an exemplary process of authorizing an untrusted device via a trusted device.
Figure 4B:
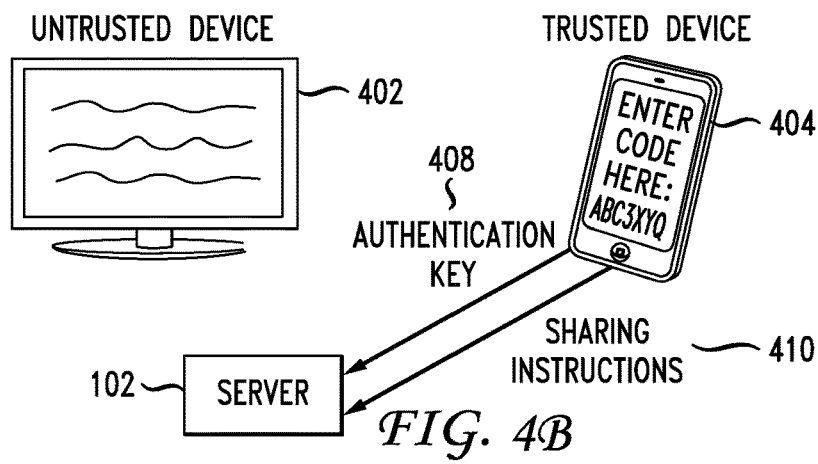
Figure 4C:
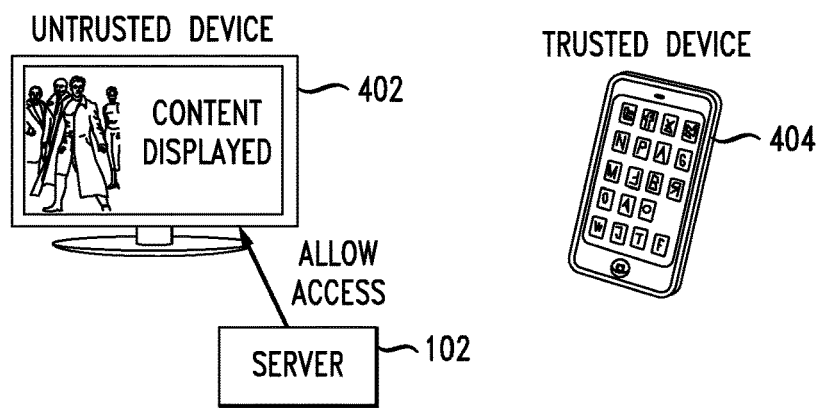

FIGS. 4A-4C show an exemplary process of authorizing an untrusted device via a trusted device. Although untrusted device 402 shown in FIGS. 4A-4C is a television, untrusted device 402 can be any one of the types of untrusted client devices 304 capable of requesting and retrieving content from server 102. Similarly, even though trusted device 404 shown in FIGS. 4A-4C is a smart phone, trusted device 404 can be any one of the types of trusted client devices 302. In this example, a user who has a user account with server 102 wants to display on a television a specific content that she has stored on server 102. However, she does not want the television to be able to access all of her data stored on server 102 because some of the data is sensitive and/or confidential. In order to grant to the television fine-grained, controlled access only to the content that she specifically designates, she can use her smart phone, a trusted device with server 102, to make the authorization. In this example, untrusted device 402 may be considered to be requesting device 104 and trusted device 404 may be considered to be authorizing device 110. Untrusted device 402 can be associated with a user account or no user account at all. The exemplary authorization process may be platform-agnostic and may occur across multiple client devices while maintaining data synchronicity.

In FIG. 4A, untrusted device 402 initially may not be authorized to access specific content on server 102. Thus, untrusted device 402 can send request 406 to server 102 to access the specific content. Server 102 can be content management system 206 that is capable of synchronizing data on multiple client devices 202. Untrusted device 402 can be client device $202_i$. Request 406 may specifically identify which content item(s) untrusted device 402 wishes to access. Request 406 may also include information that can uniquely identify untrusted device 402, such as a product name, a serial number, a model number, an IP address, a MAC address, etc. In addition, request 406 may include proposed terms, conditions, and/or parameters of access. For example, untrusted device 402 may request access for a specific content item, such as a video clip, only for the next 24 hours. In another example, untrusted device 402 may request to access a specific version of a text document, such as version 11.38. In some variations, request 406 may seek access for non-specific content items. For instance, user Angela may request through untrusted device 402 to access all the files that belong to her own user account on server 102. In another instance, user Angela can request to access every photograph that has been taken by user Brian in the past 72 hours without specifically designating individual content items.

Once request 406 is received, server 102 may determine that the sender of request 406 (i.e., untrusted device 402) is not to be trusted or otherwise lacks privilege to access the requested content. Such determination can be made by referring to the list of trusted devices that server 102 keeps in its trusted device database 280. Alternatively, a list of untrusted devices may be consulted instead. In other embodiments, lists of both trusted and untrusted devices may be used to figure out whether request 406 comes from an authorized client device or not.

If server 102 determines that request 406 originates from an unauthorized device, as shown in FIG. 4A, server 102 may initiate the authorization process by issuing authentication key 408 to untrusted device 402. Alternatively, server 102 may send an inquiry first to untrusted device 402 as to whether the authorization process should be initiated. Authentication key 408 can be a code in the form of an alphanumeric text string, an optically machine-readable code (e.g., barcode, QR code, etc.), a static image, a moving image, a video, a sound (e.g., audible sound, inaudible sound), and/or a signal (e.g., Wi-Fi, Ethernet, Bluetooth, near field communication, infrared data association). Each time server 102 receives request 406 from client devices, server 102 may generate a unique authentication key, such as authentication key 408, so that each authentication key may be uniquely linked to request 406, untrusted device 402, and/or specific content items being requested. Server 102 may also store such information, for example in authentication key database 270, so that it can be used later when authenticating untrusted device 402. In some aspects, authentication key 408 is configured for playback or presentation on untrusted device 402 such that authentication key 408 can be perceived by another device or a user of untrusted device 402. In other words, authentication key 408 is designed to be displayed, played back, transmitted, and/or broadcast from untrusted device 402.

In response to requesting access to content on server 102, untrusted device 402 receives authentication key 408 from server 102. Authentication key 408 may be transmitted through network 108. Untrusted device 402 may present authentication key 408 so that authentication key 408 may be perceived by a user or trusted device 404. For example, untrusted device 402 can display authentication key 408, such as a text string or a QR code, on a screen, as shown in FIG. 4A. In another example, untrusted device 402 can play back authentication key 408 in the form of a moving image. In yet another example, untrusted device 402 can play authentication key 408 in the form of a sound. In still yet another example, untrusted device 402 may broadcast authentication key 408 as an electromagnetic signal.

In FIG. 4B, trusted device 404 perceives authentication key 408. Trusted device 404 is authorized to grant to other devices access to content on server 102. The content may be associated with a user account. Perceiving authentication key 408 can be accomplished in numerous ways either with or without human intervention. For example, a user may simply read authentication key 408 off the screen of untrusted device 402 and input authentication key 408 on trusted device 404, as shown in FIG. 4B. Such user input can be done by using a keyboard, a keypad, a mouse, a touch screen, a stylus, a voice command, a scanner, a camera, etc. In another example, trusted device 404 may perceive authentication key 408 from untrusted device 402 without any user action. Trusted device 404 may utilize various sensors, such as a microphone, a camera, a scanner, a radio antenna, etc., to detect, either directly or indirectly, authentication key 408 presented by untrusted device 402. Even when trusted device 404 perceives authentication key 408 from untrusted device 402 without human intervention, trusted device 404 may nevertheless ask the user for a confirmation as to whether to authorize untrusted device 402 or not.

Once authentication key 408 is perceived and replicated at trusted device 404, authentication key 408 is sent to server 102 for authentication, for example, via network 108. Additionally, trusted device 404 may send a request to server 102 to transmit content items to untrusted device 402. Trusted device 404 may also transmit additional sharing instructions 410 to server 102. These instructions specify how the requested content is to be shared with untrusted device 402. In other words, the user of trusted device 404 may use the device to custom design how individual content item is to be shared with untrusted device 402. The user can, for instance, specify which content items to share, which versions of the content items to share, what types of access privilege to allow (e.g., read, write, modify, execute, share, full control, etc.), when to allow access, the method of delivery (e.g., view in web browser, playback, download, mobile access, etc.), the number of accesses (e.g., may be downloaded only three times), when the access privilege is to expire, etc. Such instructions can be based on any requested privileges, parameters, terms, and conditions, if there are any, proposed by the user of untrusted device 402. In such cases, the user of trusted device 404 may accept the proposed terms, modify the proposed terms, or ignore the proposed terms and create entirely new terms and conditions for sharing data.

For example, Allison, the user of untrusted device 402 may request to gain read/write privilege to her company's budget report document, 3Q_Budget_Report.xls stored on server 102. She gives authentication key 408 to Brandon, the user of trusted device 404, and asks him to authorize her client device to access the requested information. Brandon, however, transmits authentication key 408 to server 102 only after modifying Allison's proposed access privilege to read-only instead of read/write, because Brandon does not feel it would be safe for her to modify any data on untrusted device 402. If there are multiple versions of the same document, Brandon may also limit untrusted device 402's access to a specific version of the document (e.g., only access current version, access only latest version, access only version 3.14.15, access all versions). As new versions of a content item become available, the corresponding access privilege may be dynamically adjusted accordingly. For instance, if untrusted device 402 is given access privilege to only the newest version of a certain file, when a new version of the file becomes available, untrusted device 402 will have access to the new version but no longer be able to access any older versions.

In another example, user Andy wants to pull up a document from server 102 on untrusted device 402, which, in this example, is a publicly shared desktop computer in a local public library. The document, however, contains some sensitive data such as his social security number, multiple credit scores, and medical history records. From untrusted device 402, Andy requests access to the document on server 102 and receives authentication key 408 from server 102 in the form of a QR code displayed on the monitor of untrusted device 402. Andy's smart phone, which is trusted device 404, immediately recognizes the QR code and prompts him to confirm whether to authorize the desktop computer's access to the document. Andy limits untrusted device's 304 access privilege to "web view only/no downloading allowed/expires in 2 hours," then confirms the authorization. Andy can now access the document on the public library computer. However, the library computer can only view the document from a web browser for the next two hours, and he cannot download the file from the library computer.

Server 102 receives authentication key 408 and sharing instructions 410, if there are any, from trusted device 404. Server 102, at this point, may compare the received key with the one that it issued and has stored, for instance inside authentication key database 270, to determine if there is a match. If the received authentication key matches the issued authentication key, then server 102 can authorize untrusted device's 304 access to the requested content. If there is no match, then request 406 can be denied. In addition to authorizing untrusted device's data access, server 102 can sometimes permanently or temporarily elevate the status of untrusted device 402 to that of a trusted device, and/or add untrusted device 402 to the list of trusted devices. Moreover, server 102 may also grant untrusted device a privilege to invite or authorize other untrusted devices.

In FIG. 4C, when server 102 determines that the user has properly authorized the device to have access to the content, server 102 can finally allow untrusted device 402 to access the content on server 102. Allowing access can be accomplished in many different ways. Server 102 can send a link, such as a URL, to untrusted device 402 where the desired content may be accessed and/or downloaded. Server 102 can also send a token, with which untrusted device 402 can access the desired content. The token can be a code, a password, a data string, etc. In addition, server 102 can simply directly transmit the data to untrusted device 402. Moreover, server 102 can flag untrusted device 402 as an authorized device and/or a trusted device with appropriate privileges.

If any sharing instructions 410 had been received from trusted device 404, those instructions can be followed when server 102 allows access. For example, if sharing instructions 410 dictate that a certain file be accessed for a specific period of time, then server 102 would allow untrusted device 402 to access the file only during that time period. Additionally, server 102 may, if necessary, prepare, package, and/or configure the data being pushed to untrusted device 402 in order to comply with sharing instructions 410. For example, server 102 can compress the requested data to reduce the size of the data, encrypt the requested data to ensure secure delivery of the data, truncate the data to redact or excise any inappropriate material, place additional limitations on the data, etc.

FIGS. 5A-5D show an exemplary process of authorizing an unauthorized user account through an authorized user account. This process is similar to the one shown in FIGS. 4A-4C. However, instead of authenticating an untrusted device, the process shown herein involves authorizing a user account that is not yet authorized to access a requested content item. The two exemplary authorization methods share many similar concepts and principles. Thus, the ideas presented above regarding the device authorization process may also apply to the process shown in FIGS. 5A-5D. Throughout this disclosure, the terms "user" and "user account" may be occasionally used interchangeably. For example, if a user is authorized to access data, then it may be the case that the user account associated with the user is given access to the data. Similarly, if the user requests access to data, it may be equivalent to the user requesting that her user account be given access to the data.

In FIGS. 5A-5D, requesting user 106 wishes to access specific content items, such as a file, a document, a software application, a video, an audio, etc., stored inside server 102 from her requesting device 104. Requesting user 106, however, does not have a user account that is authorized to access the content items on server 102. Authorizing user 112 using authorizing device 110, on the other hand, does have a user account that is authorized by server 102 to grant access to other unauthorized users with regards to the content items. Authorizing user 112, however, may or may not have access to the content items himself. In other words, authorizing user 112 may not have access to certain data on server 102 but may still have the authority to grant other users the right to access the same data. Although requesting device 104 shown in FIGS. 5A-5D is a tablet, requesting device 104 can be any type of client device capable of requesting and retrieving content from server 102. Similarly, even though authorizing device 110 shown in FIGS. 5A-5D is a desktop computer, authorizing device 110 can be any type of client device. Although requesting device 104 and authorizing device 110 are shown in FIGS. 5A-5D as two separate devices, they can be one and the same device shared by requesting user 106 and authorizing user 112. Server 102 can be content management system 206 that is capable of synchronizing data on multiple client devices 202. Requesting device 104 and authorizing device 110 can be two of client devices 202.

Figure 5A:
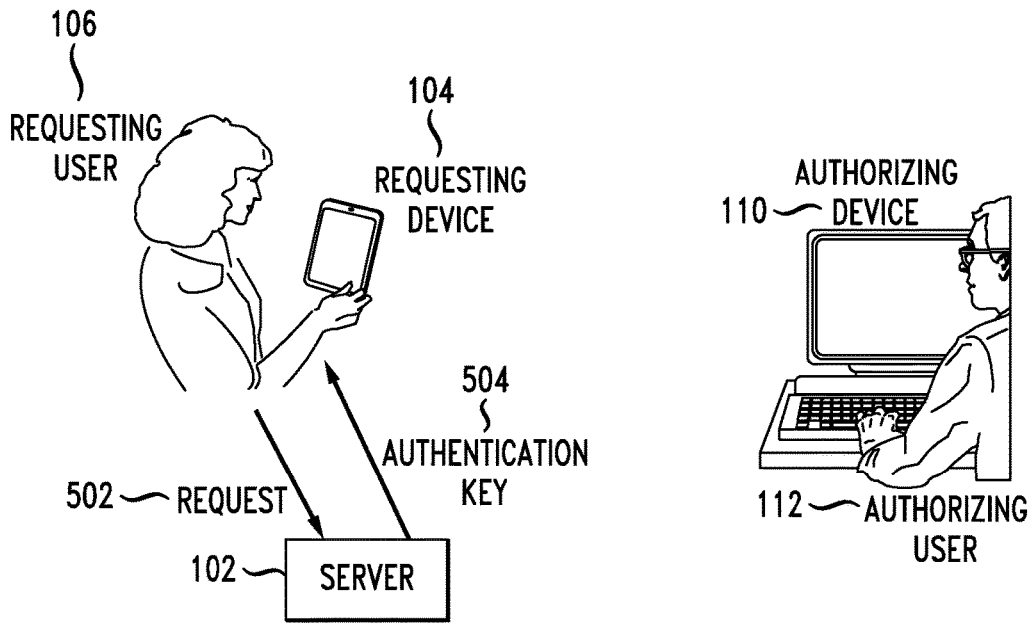
FIGS. 5A-5D show an exemplary process of authorizing an unauthorized user account through an authorized user account.

In FIG. 5A, requesting user 106 sends request 502 to server 102 through requesting device 104. Request 502 is for accessing one or more content items residing on server 102. Request 502 may specifically identify which content item(s) requesting user 106 wishes to access, or non-specifically define the requested items using filter and/or conditions (e.g., any file created or modified in the last 48 hours). Request 502 may also include information that can uniquely identify requesting user 106 and/or the user account associated with requesting user 106. Request 502 may also include proposed terms, conditions, and/or parameters of access.

Once request 502 is received, server 102 may determine whether the requesting user 106 has access to the requested content. If server 102 determines that request 502 originates from an unauthorized user, server 102 may initiate the authorization process by issuing authentication key 504 to requesting user 106. Authentication key 504 can be a code in the form of an alphanumeric text string, an optically machine-readable code (e.g., barcode, QR code, etc.), a static image, a moving image, a video, a sound (e.g., audible sound, inaudible sound, ultrasonic sound), and/or a signal (e.g., Wi-Fi, Ethernet, Bluetooth, near field communication, infrared data association). Each time server 102 receives request 502 from client devices, server 102 may generate a unique authentication key 504 so that each authentication key 504 may be uniquely linked to request 502, requesting user 106, and/or specific content items being requested. Server 102 may also store such information, for example in authentication key database 270, so that it can be used later for authenticating requesting user 106. In some aspects, authentication key 504 is configured for playback or presentation on requesting device 104. In other words, authentication key 504 is designed to be displayed, played back, transmitted, and/or broadcast from requesting device 104 so that it can be later perceived by authorizing device 110 or authorizing user 112.

In response to requesting access to content on server 102, requesting device 104 receives authentication key 504 from server 102. Authentication key 504 may be transmitted through network 108. The received authentication key 504 is then presented on requesting device 104. For example, requesting device 104 may display authentication key 504, such as a text string or a QR code, on its screen. In another example, requesting device 104 can play back authentication key 504 in the form of a moving image. In yet another example, requesting device 104 can play authentication key 504 in the form of a sound. In still yet another example, requesting device 104 may broadcast authentication key 504 as an electromagnetic signal.

Figure 5B:
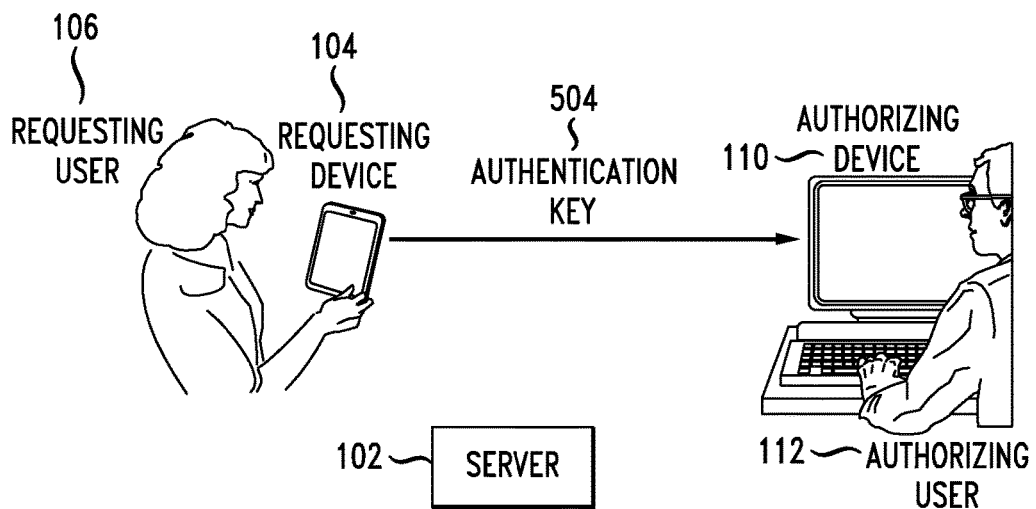

In FIG. 5B, requesting user 106 asks authorizing user 112 to authorize request 502. This can be accomplished by giving authentication key 504 to authorizing user 112 so that it can be entered into authorizing device 110. Requesting user 106 can simply read off authentication key 504 to authorizing user 112 as it appears on the screen of requesting device 104. Alternatively, authorizing device 110 may perceive authentication key 504 from requesting device 104 with little or no intervention by authorizing user 112. Authorizing device 110 may utilize various sensors, such as a microphone, a camera, a scanner, a radio antenna, etc., to detect, either directly or indirectly, authentication key 504 presented by requesting device 104. Authorizing device 110 may ask authorizing user 112 for a confirmation as to whether to authorize requesting user 106 or not.

Figure 5C:
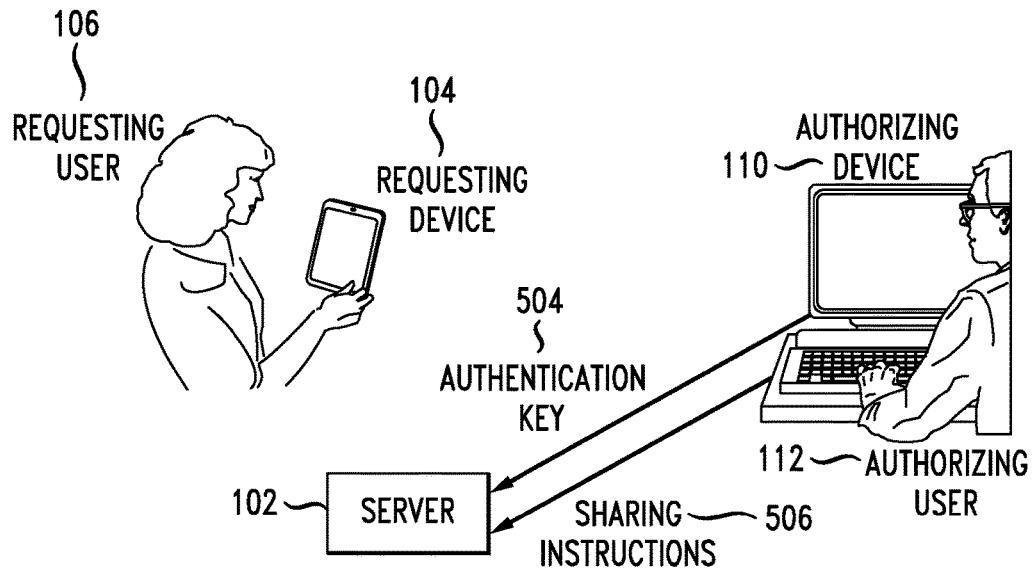

In FIG. 5C, authorizing user 112 decides whether to grant access as requested by requesting user 106. Should authorizing user 112 determine that requesting user 106 may access the requested content items on server 102, authorizing user 112 sends authentication key 504 to server 102 for authentication. Server 102 may attempt to authenticate the identity of the sender of authentication key 504 as authorizing user 112, with the user account of authorizing user 112. In other words, by providing his personal credentials (e.g., username, password, etc.) to server 102, authorizing user 112 can prove to server 102 that authentication key 504 is sent from a user account with appropriate privilege to authorize other users' access. Additionally, authorizing user 112 may transmit additional sharing instructions 506 to server 102. These instructions specify how the content is to be shared with requesting user 106. In this way, authorizing user 112 may instruct as to how individual content item is to be shared with requesting user 106. Authorizing user 112 can, for example, specify which content items to share (including which versions of the content items to share), what types of access privilege to allow (e.g., read, write, modify, execute, share, full control, etc.), when to allow access, when the access privilege is to expire, the allowed method of access (e.g., view in web browser, playback, download, mobile access, etc.), and other restrictions or limitations. Sharing instructions 506 can be based on the proposed privileges, parameters, terms, and/or conditions, if there are any, by requesting user 106. In such cases, the authorizing user 112 may accept the terms as proposed, modify the proposed terms, or ignore the proposed terms all together and create new terms and conditions for accessing the content.

For example, requesting user 106 Adrienne may request to see the photos that her grandson Bill is storing on server 102. Adrienne receives authentication key 504 and emails the key to authorizing user 112 Bill. Bill authorizes his grandmother's access to the photos and gives her full control of the photos. Even though Adrienne does not have a user account with server 102, server 102 issues to Adrienne a token, with which Adrienne can read, write, modify, etc. Bill's photos on server 102.

In another example, requesting user 106 Andrew wishes to submit his homework to a shared folder that authorizing user 112 Professor Beesley set up on server 102 as a submission box. Andrew seeks out the folder on server 102 and requests access privilege for the folder. Recognizing Andrew's user account as lacking authorization for such privilege, server 102 issues authentication key 504 to Andrew. Andrew holds out his requesting device 104, a tablet PC, to Professor Beesley and the device plays authentication key 504, which in this example is a unique sound signature. Professor Beesley's laptop PC, authorizing device 110, recognizes the sound signature and asks Beesley whether to continue with the authorization process. Professor Beesley confirms the authorization and the laptop PC sends authentication key 504 to server 102 along with an instruction to only allow write privilege and not read privilege because students may not read the documents in the shared folder submitted by other students.

Server 102 receives authentication key 504 and sharing instructions 506, if there are any, from authorizing user 112. Server 102 then may compare the received key with the one that it issued and has stored, for instance inside authentication key database 270, to determine whether the two keys are identical. If the received authentication key corresponds to the issued authentication key, then server 102 can authorize requesting user 106 to access the requested content, subject to any sharing instructions 506. If there is no match, then request 502 may be denied. In addition, server 102 may also grant requesting user 106 a privilege to authorize other unauthorized users' access to the content.

Figure 5D:
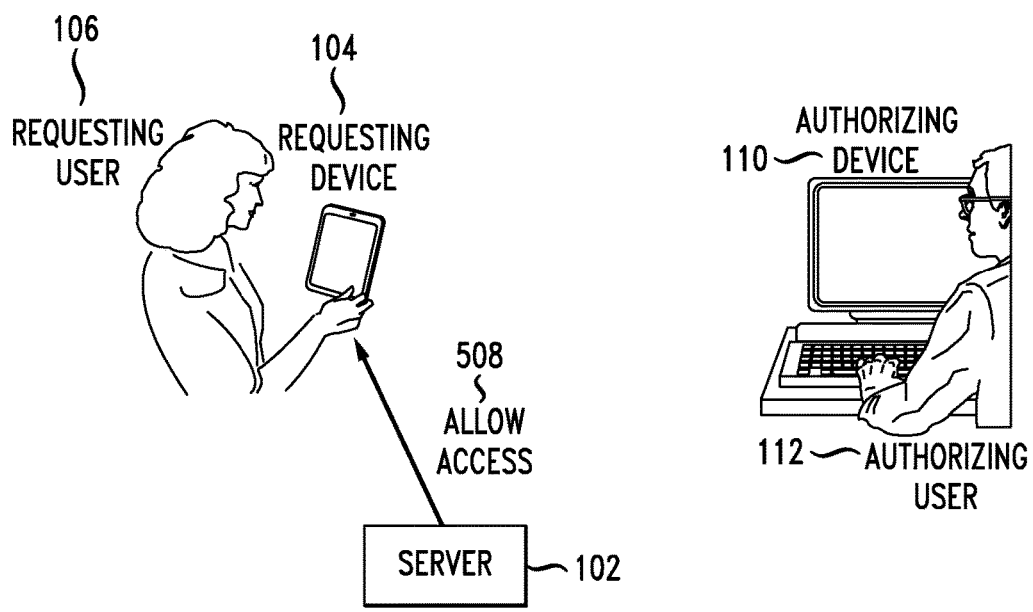

In FIG. 5D, when server 102 determines that the authentication process was successful, server 102 can allow requesting user 106 to access the requested content from server 102. Since the authorization is tied to requesting user 106 and/or her user account, it matters not, in general, which client device requesting user 106 uses to access server 102. Allowing access can be accomplished in many different ways. For instance, server 102 can send to requesting user 106 a link, such as a URL, where the desired content may be accessed. Server 102 can also send a token, with which requesting user 106 can access the desired content. The token can be a code, a password, a data string, etc. Otherwise, server 102 can simply directly transmit the data to requesting user's 106 device. In addition, server 102 can register requesting user 106 as an authorized user.

If any sharing instructions 506 had been received from authorizing user 112, those instructions can be honored when server 102 allows access. For example, if sharing instructions 506 dictate that a certain file be accessed for a specific period of time, then server 102 would allow requesting user 106 to access the file only during that time period. Additionally, server 102 may, if necessary, prepare, package, and/or configure the data being shared in order to comply with the sharing instructions 506. For example, server 102 can compress the requested data to reduce the size of the data, encrypt the requested data to ensure secure delivery of the data, truncate the data to redact or excise any inappropriate material, place additional limitations on the data, etc.

Figure 7:
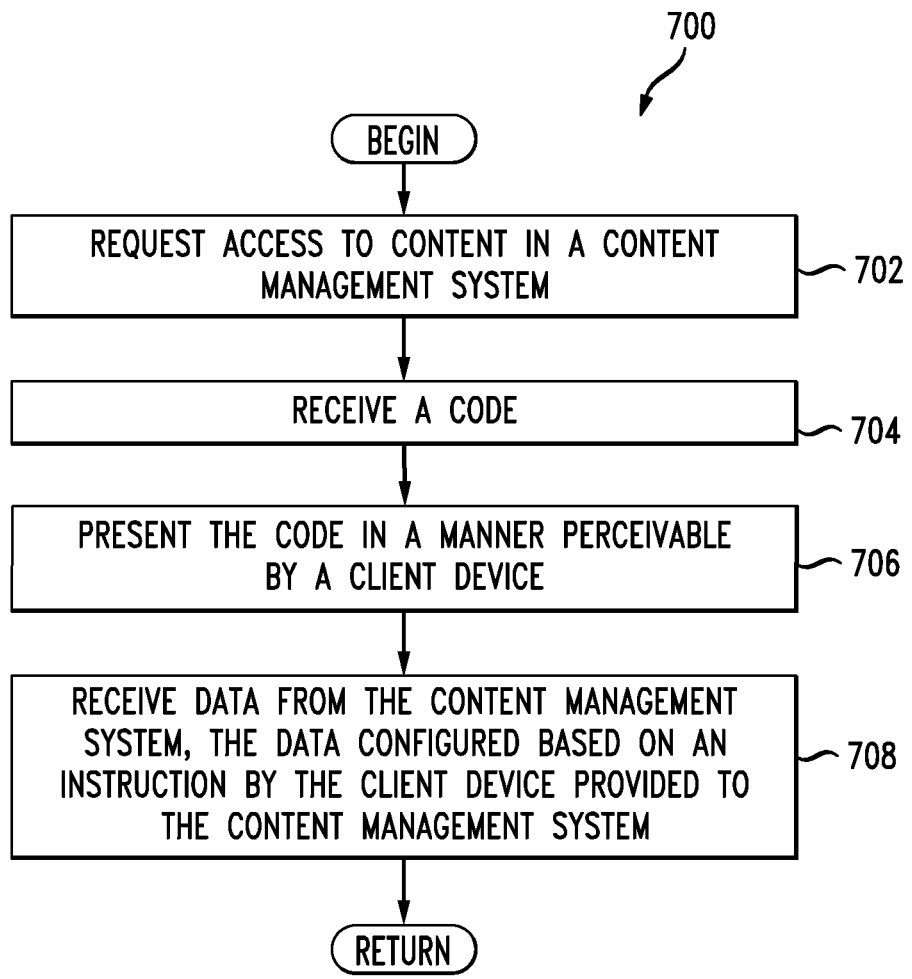
FIG. 7 shows a second example method embodiment.
Figure 8:
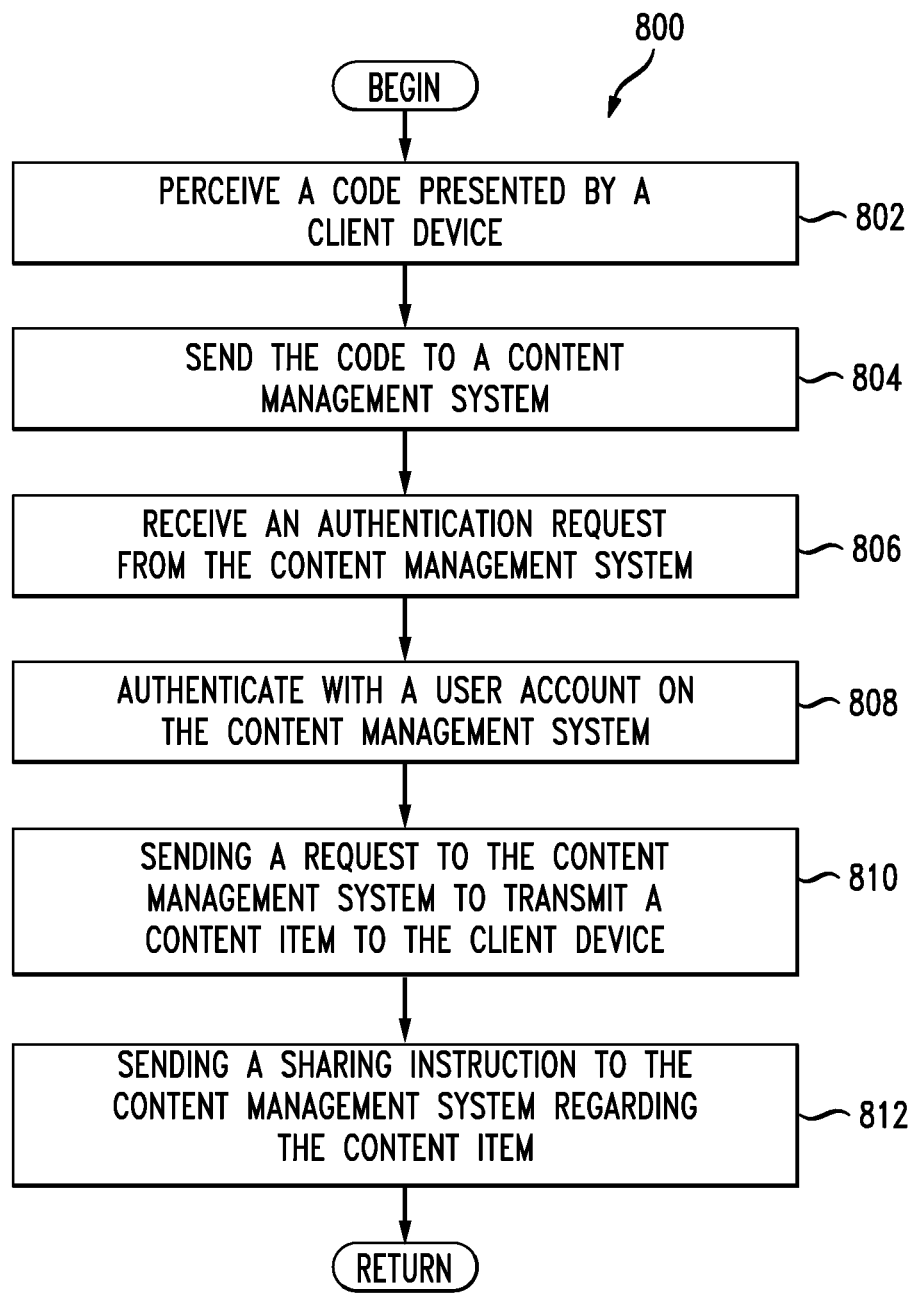
FIG. 8 shows a third example method embodiment.

Having disclosed some basic system components and concepts, the disclosure now turns to the first exemplary method embodiment shown in FIG. 6. For the sake of clarity, the method is described in terms of an exemplary content management system 206 as shown in FIG. 2 configured to practice the method. The steps outlined in FIGS. 6-8 are exemplary and can be implemented in any combination thereof, including combinations that exclude, add, or modify certain steps.

Content management system 206 receives a request from a first client device to access content (602). The first client device may be an untrusted device, which does not initially have access privilege with content management system 206 with regards to the content. The content may be configured to be accessible only to trusted client devices. The first client device may be a desktop computer, a mobile computer, a mobile communications device, a mobile phone, a smart phone, a tablet, a television, a set-top box, a vehicle telematics, a wearable computer, or any other device capable of accessing the content. The system then transmits to the first client device a first authentication key configured for presentation (604). The authentication key can be a code that uniquely identifies the request and/or the first client device. Authentication key can be in the form of a text string, an optically machine-readable code, a static image, a moving image, a video, a sound, a signal, or any combination thereof. The first authentication key may be active only for a specified period of time. For example, once issued by content management system 206, the first authentication key may expire after a certain predefined time period, after which the key can no longer be used for authentication purposes.

Content management system 206 may then receive a second authentication key from a second client device (606). The second client device may be a trusted device, which has been given authority to invite or authorize other untrusted devices to have access to certain contents on content management system 206. The second authentication key may have been obtained by the second client device through the first client device. Alternatively, a user may have transferred the authentication key from the first client device to the second client device. In addition, the second client device may have obtained or perceived the second authentication key directly from the first client device. Triggered in response to receiving the second authentication key from the second client device, content management system 206 may also send an authentication request to the second client device (608). In response, the second client device may send a confirmation of the authentication along with any additional instructions.

Content management system 206 may receive an instruction from the second client device (610). The instruction may pertain to terms, conditions, limitations, and/or restrictions of the first client's access to the content. For example, the instruction may dictate that the first client only be able to access the content at a particular time, through a particular delivery method, before a particular expiration time, etc. The instruction may specify which particular content item the terms, conditions, etc. pertain to. For example, content management system 206 may receive multiple instructions, each of which pertaining to a different content item.

Content management system 206 may determine whether the second authentication key matches the first authentication key (612). Content management system 206 may determine whether the two keys are identical. When a match is found between the two keys, content management system 206 may transmit data to the first client device, where the data is configured based on the content and the instruction (614). The data can be a URL that provides access to the content, a token, or a content item. It is possible for the provided URL to be deactivated after a predefined period of time. For example, the URL link given to the first client device may expire after 24 hours and the content may no longer be available after that. The URL may also present a user interface, which displays a version of the content being provided. In such embodiments, the URL can be refreshed so that a new or different version of the content may be displayed. If the second authentication key does not match the first authentication key, then content management system 206 may deny the first client device access to the content (616).

FIG. 7 shows a second example method embodiment. For the sake of clarity, the method is described in terms of an exemplary client device $202_i$ as shown in FIG. 2 configured to practice the method. Client device $202_i$ can be an untrusted device, which is not yet registered with or authorized by a server such as a content management system.

Client device $202_i$ requests access to content in a content management system (702). The content can be of any type of data including digital data, a document, a text file, an audio file, a video file, an application data, etc. The content management system may be synchronized across multiple devices across the network, such as Dropbox™ from Dropbox Inc. of San Francisco, Calif. Client device $202_i$ may then receive a code (704). The code may be an authentication key issued by the content management system for the purpose of authenticating client device's $202_i$ identity, trustworthiness, etc. Client device $202_i$ presents the code in a manner perceivable by another client device (706). Presenting the code can be accomplished by displaying a text string on a screen, displaying a QR code on the screen, displaying an image on the screen, playing a video clip on the screen, playing back a sound through a speaker, etc. The other client device may likewise perceive the code through user input, a scanner, a camera, a microphone, an antenna, etc.

Finally, client device $202_i$ may receive data from the content management system, where the data is configured based on an instruction provided by the other client device to the content management system (708). The data may be based on what client device $202_i$ has requested to access. However, the data can be modified, packaged, manipulated, etc. according to the other client device's instructions. The instructions can be about what to share, how to share, when to share, whom to share with, etc. The data can be a URL providing access to a content item, a token, or the content item itself.

FIG. 8 shows a third example method embodiment. For the sake of clarity, the method is described in terms of an exemplary client device $202_i$ as shown in FIG. 2 configured to practice the method. Client device $202_i$ can be a trusted device, which has the power to authorize other devices' request to access content on a server such as an online content management system.

Client device $202_i$ may perceive a code, such as an authentication key, presented by another client device (802). The other client device can be an untrusted device that is not yet recognized by the content management system. Perceiving the code can be accomplished, for instance, by receiving a text input, receiving an audio input, or capturing an image of the code presented on the display of the other client device. Once client device $202_i$ perceives the code, it sends the code to the content management system (804). The content management system can use the code to authenticate the original sender of the code (i.e., the other client device) and to authorize the other client device to access any data that the device may have requested. Client device $202_i$ may perform its own verification process to validate that the code conforms to a predefined format before transmitting it to the content management system. For example, client device $202_i$ may refuse to send to the content management system the code that it received from the other client device in the form of a QR code if client device $202_i$ determines that the QR code does not meet all the standard QR code specifications. Similarly, client device $202_i$ may reject a 9-digit authentication key string when it is expecting to receive a 10-digit authentication key string.

Optionally, client device $202_i$ may receive an authentication request from the content management system (806). Such request may be sent by the content management system to confirm the intent of the code's sender. The request may also be sent in order to authenticate the user's identity. Accordingly, client device $202_i$ authenticates with a user account on the content management system (808). For example, user Brianna has a user account on Dropbox™ and would like to authorize her friend Alexa to gain access to Brianna's personal files on Dropbox™. Brianna relays the authentication key that she received from Alexa's client device to Dropbox™. Since Dropbox™ not yet know whether Brianna has proper authority to authorize Alexa's access to the files, Dropbox™ sends an authentication request to Brianna in the form of a user login window. Brianna types in her Dropbox™ and the corresponding password to prove that she is indeed the owner of the files and that she has the invite/share privilege to let other people access her personal files.

Client device $202_i$ may also send a request to the content management system to transmit a content item to the client device (810). The content item may be the same content item that the other client device has previously requested. Client device $202_i$ may additionally send a sharing instruction to the content management system regarding the content item (812). For instance, the sharing instruction may lay out the terms, conditions, restrictions, or limitations of the other client device's access to the content item. The sharing instruction can be part of the request to transmit the content item. The sharing instruction can include a delivery method or an expiration time.

Figure 9A:
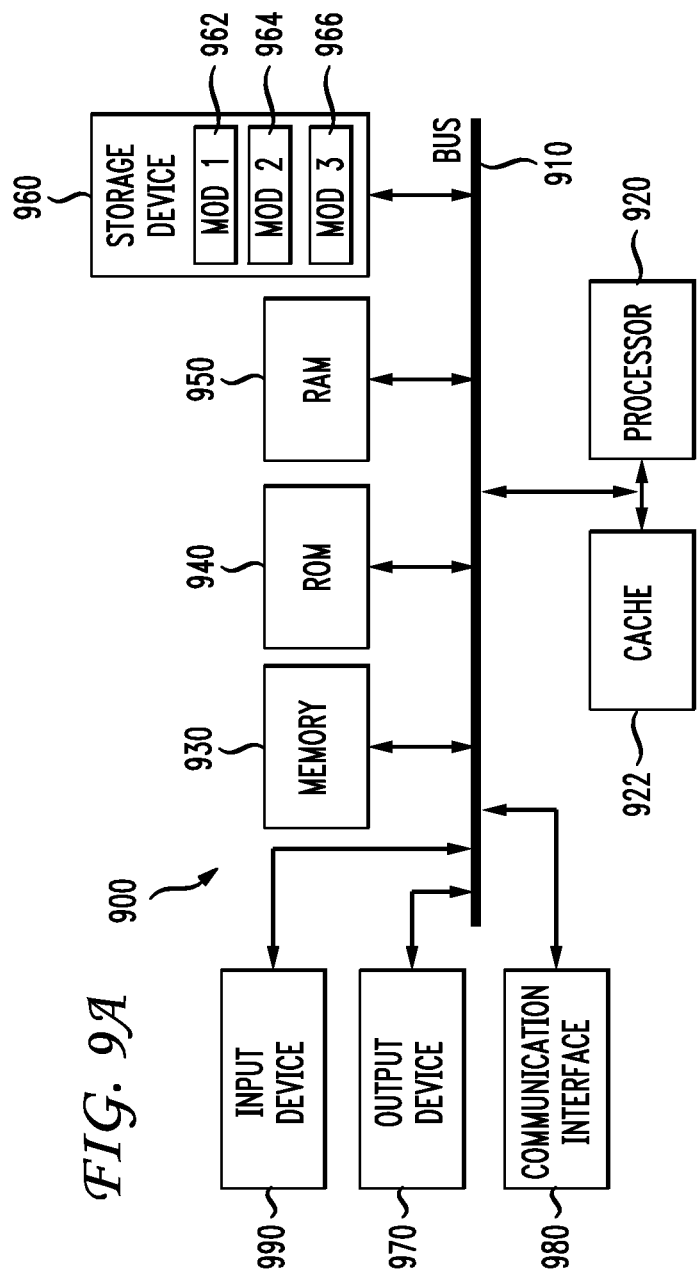
FIG. 9A shows an exemplary possible system embodiment for implementing various embodiments of the present technology.
Figure 9B:
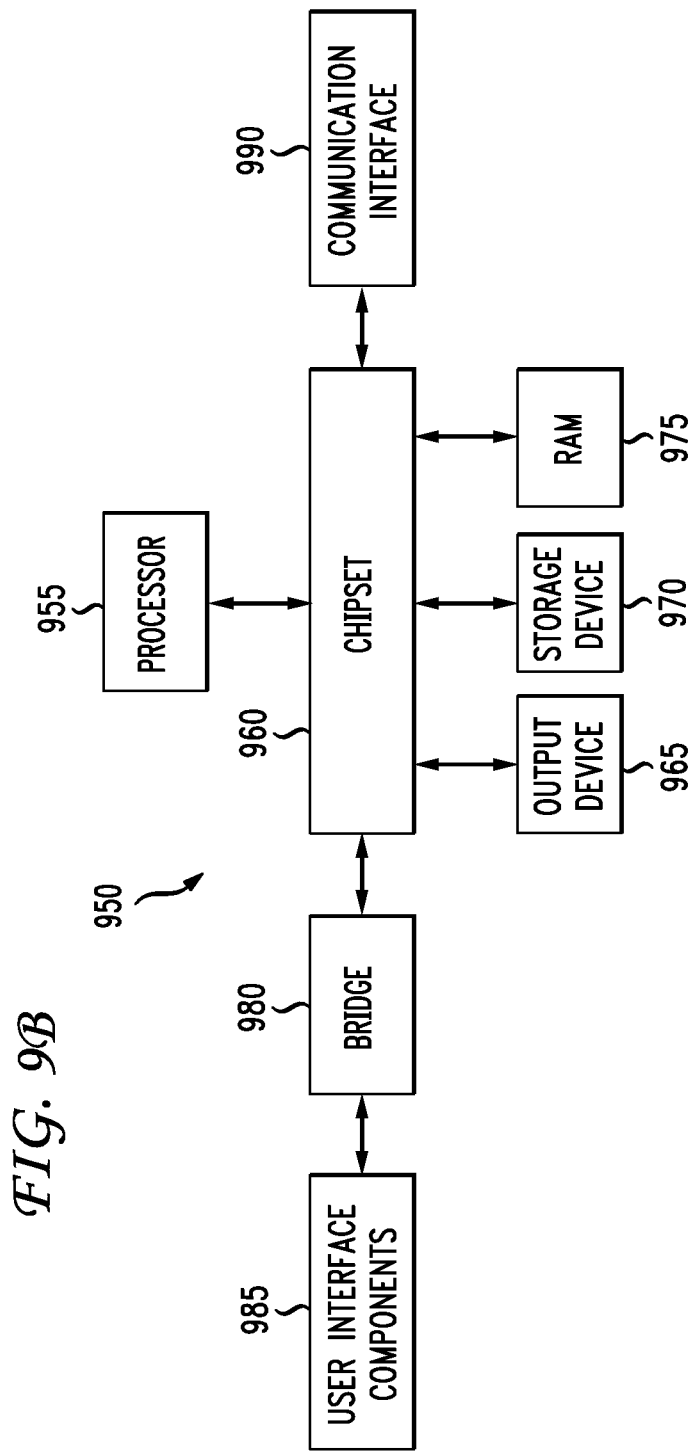
FIG. 9B shows an exemplary possible system embodiment for implementing various embodiments of the present technology.

FIG. 9A and FIG. 9B show exemplary possible system embodiments. The more appropriate embodiment will be apparent to those of ordinary skill in the art when practicing the present technology. Persons of ordinary skill in the art will also readily appreciate that other system embodiments are possible.

FIG. 9A shows a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B shows a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A synchronized online content management system comprising:
   a processor; and
   memory, including instructions that, when executed by the processor, cause the computing system to:
   receive a request from a first client device to access content in an account in the synchronized online content management system, wherein the first client device is a client device authorized to access the content in the account;
   send a first code to the first client device, the first code configured for playback on the first client device;
   receive a second code from a second client device and determine a match between the first code and the second code, and in response to the match between the first code and the second code, restrict the second client device from accessing the content associated with the account of the first client device on the synchronized online content management system; and
   receive, by the synchronized online content management system from the second client device, an instruction and data associated with the instruction for the account associated with the first client device;
   deliver to the account associated with the first client device by the synchronized online content management system the data received from the second client device, by associating the data with the account associated with the first client device based upon a match between the first code and the second code.

2. The system of claim 1, wherein the second device data provides access to content, a token, or a content item.

3. The system of claim 1, wherein the first code is at least one of a text string, an optically machine-readable code, an image, a video, or a sound.

4. The system of claim 1, wherein the first code is active for a specified period of time.

5. The system of claim 1, wherein the instruction includes at least one content item and a delivery method.

6. The system of claim 5, wherein the instruction further includes an expiration time.

7. A computer-implemented method comprising:
   presenting, via a processor on a first client device, a first code received by an unauthorized application, the first code associated with an account of a content management system;
   sending, from a second client device to the content management system, a second code from an authorized application associated with the account of the content management system; and
   sending a request from the authorized application to the content management system to transmit a content item from the content management system to the unauthorized application on the first client device after a match between the first code and the second code is determined, and in further response to the match between the first code and the second code, the request denies access to the account by the unauthorized application and the unauthorized application of the first client device delivers, based on an instruction, a second content item to the content management system for delivery to the account of the second client device by associating the second content item with the account of the second client device.

8. The method of claim 7 further comprising:
   authenticating with an account on the content management system.

9. The method of claim 8, wherein the authenticating occurs in response to an authentication request from the content management system after the first code is received at the first client device.

10. The method of claim 7, wherein presenting the first code on the first client device causes, at the second client device, at least one of receiving a text input, receiving an audio input, or capturing an image associated with the first code presented on a display on the first client device.

11. The method of claim 7, wherein the request further includes at least one of a delivery method or an expiration time.

12. A manufacture comprising:
   a non-transitory computer-readable storage medium; and
   a computer executable instruction stored on the non-transitory computer-readable storage medium which, when executed by a computing device, causes the computing device to perform a method comprising:
   in response to receiving a request from a first client device to access content in an account on a server, transmitting to the first client device a first authentication key configured for presentation, wherein the first client device is a client device authorized to access the content in the account;
   receiving a second authentication key from a second client device, wherein the second client device is an unauthorized client device to the account; and
   receiving second content from the second client device;
   determining a match between the first authentication key and the second authentication key, and based upon the match, permitting the second client device to deliver a second content to the server for the account and not authorizing the second client device to access the account after determining the match; and transmitting data to the first client device from the server, the data configured based on the second content and an instruction received from the second client device.

13. The manufacture of claim 12, the method further comprising:
sending an authentication request to the second client device, the authentication request triggered in response to receiving the second authentication key from the second client device.

14. The manufacture of claim 12, wherein the data is at least one of a uniform resource locator (URL) providing access to at least one of the content, a token, or a content item.

15. The manufacture of claim 14, wherein the URL is deactivated after a predefined period of time.

16. The manufacture of claim 14, wherein the URL presents a user interface displaying a version of the content.

17. The manufacture of claim 16, the method further comprising:
refreshing the URL, the refreshing causing a display of a second version of the content.

18. The system of claim 1, wherein the first code is received by the second client device subsequent to playback on the first client device.

* * * * *